US007769350B2

(12) United States Patent  (10) Patent No.: US 7,769,350 B2
Schreiber  (45) Date of Patent: Aug. 3, 2010

(54) SYSTEM AND METHOD FOR ADAPTING SYSTEM PARAMETERS IN RADIO BASED COMMUNICATIONS SYSTEMS

(75) Inventor: Gerhard Schreiber, Korntal-Münchingen (DE)

(73) Assignee: Alcatel Lucent, Paris (FR)

( * ) Notice: Subject to any disclaimer, the term of this patent is extended or adjusted under 35 U.S.C. 154(b) by 782 days.

(21) Appl. No.: 11/508,281

(22) Filed: Aug. 23, 2006

(65) Prior Publication Data

US 2007/0077885 A1 Apr. 5, 2007

(30) Foreign Application Priority Data

Sep. 30, 2005 (EP) ................... 05292047

(51) Int. Cl.
*H04B 17/00* (2006.01)
(52) U.S. Cl. ............... 455/67.16; 455/16; 455/12.1; 455/39; 455/437; 455/423; 375/132; 375/260; 375/346
(58) Field of Classification Search .......... 375/132, 375/260, 346; 455/437, 39, 67.16, 12.1, 455/423
See application file for complete search history.

(56) References Cited

U.S. PATENT DOCUMENTS

| 6,532,365 | B1 * | 3/2003 | Anderson et al. ........... 455/437 |
| 2001/0009405 | A1 * | 7/2001 | Chang et al. ........... 342/357.01 |
| 2002/0101943 | A1 * | 8/2002 | Proctor, Jr. ................. 375/346 |
| 2002/0176482 | A1 * | 11/2002 | Chien ......................... 375/132 |

FOREIGN PATENT DOCUMENTS

| EP | 1 492 294 A2 | 12/2004 |
| EP | 1 569 492 A2 | 8/2005 |
| WO | WO 01/43333 A1 | 6/2001 |
| WO | WO0143333 A1 * | 6/2001 |
| WO | WO 02/43341 A2 | 5/2002 |

OTHER PUBLICATIONS

Distance based dynamic adaptation of the air interface in TDMA Le Strat, E. Wantier, A. This paper appears in: Communications and Vehicular Technology in the Benelux, 1994., IEEE Second Symposium on Publication Date: Nov. 2-3, 1994 On pp. 208-215.*
E. Le Strat et al, "Distance based dynamic adaptation of the air interface in TDMA", Communications and Vehicular Technology in the Benelux, 'Online! Nov. 2, 1994, pp. 208-215, XP002365750.
3GPP TS 05.08 V8.16.0—Apr. 2003—$3^{rd}$ Generation Partnership Project; Technical Specification Group GSM/EDGE Radio Access Network; radio subsystem link control (Release 1999).

* cited by examiner

*Primary Examiner*—Kamran Afshar
*Assistant Examiner*—Chuong A Ngo
(74) *Attorney, Agent, or Firm*—Fay Sharpe LLP

(57) ABSTRACT

A method for adapting at least one system parameter (i) defining a connection between a transmitter unit and a receiver unit in a radio based communications system, wherein an adaptation frequency at which the system parameter (i) is adapted is dependent on at least one derivative of order n, n=0; 1, of a distance between the transmitter unit and the receiver unit with respect to time. Thus, the method provides an efficient way of relating the need to update system parameters in radio based communications systems to physically measured quantities in connection with constituents of the system, such that the parameter adaptation rate itself is adapted dynamically and system resources can be used in an optimized fashion.

20 Claims, 3 Drawing Sheets

SYSTEM AND METHOD FOR ADAPTING SYSTEM PARAMETERS IN RADIO BASED COMMUNICATIONS SYSTEMS

The invention is based on a priority application 05292047.7 which is hereby incorporated by reference.

TECHNICAL FIELD OF INVENTION

The present invention relates generally to radio based communications systems, in particular—but not exclusively—for mobile communication. More specifically, the present invention relates to a method and a system for adapting system parameters in radio based communications systems.

BACKGROUND OF THE INVENTION

During operation of radio based communications systems, due to a temporally and spatially varying environment many system parameters have to be adjusted to ensure a high quality of service during a communication session. Examples of such system parameters which generally define a connection between a transmitter unit, e.g. an access point or a base station, and a receiver unit, e.g. a mobile terminal, are output power, modulation format, coding scheme, etc. Today, the adaptation of system parameters in radio based communications systems is performed at more or less fixed, i.e., predetermined temporal intervals. See, for instance, "3$^{rd}$ Generation Partnership Project; Technical Specification Group GSM/EDGE Radio Access Network; Radio subsystem link control (Release 1999) (3GPP TS 05.08 V8.16.0 (2003-04))", Chapter 4—RF power control, in particular Item 4.7—Timing, wherein power level control steps occur at a rate of one step every 60 ms. In this way, prior art adaptation methods initiate updates of relevant system parameters at essentially fixed intervals. In addition, even if there is no need to update the currently used parameters a so-called signaling event is triggered which involves notification of system parameters which have been reported previously. However, such an approach is a drawback in situations where faster adaptation is required, e.g. in heavily varying environments. On the other hand, in some cases a slower adaptation frequency would be sufficient. If the corresponding adaptation and signaling algorithms are performed needlessly, this corresponds to a effective waste of communication system resources.

Thus, there is a need in the art for a method and a system which realize a dynamic correction of the rate or frequency at which adaptation and/or signaling events of system parameters occur, and which can be used to initiate single adaptation and/or signaling events.

It is the object of the present invention to provide a method which realizes a dynamic correction of the rate or frequency at which adaptation and/or signaling events of system parameters occur. It is also an object of the present invention to provide a radio based communications system which can be operated in accordance with the inventive method. Furthermore, the present invention aims at providing a computer program product operable to translate into action the above-mentioned method in accordance with the present invention.

SUMMARY OF THE INVENTION

According to a first aspect of the invention the object is achieved by providing a method for adapting at least one system parameter defining a connection between a transmitter unit and a receiver unit in a radio based communications system, wherein an adaptation frequency, i.e. a frequency at which the at least one system parameter is adapted, is dependent on at least one derivative of order n (n=0; 1) of a distance between the transmitter unit and the receiver unit with respect to time. The derivative of order 0 of the distance between the transmitter unit and the receiver unit with respect to time is equivalent to the distance itself. The derivative of order 1 of the distance between the transmitter unit and the receiver unit with respect to time is equivalent to the relative velocity of these two units. Other quantities can be added and might lead to higher order (n>1) adaptation algorithms.

Here and in the following specification, the term "transmitter unit" refers to any unit or device acting as a transmitter in a given communication scenario. Typically, this will be a spatially fixed transmitter, e.g. an access point or base station. However, the present invention is not limited to such configurations.

Correspondingly, the term "receiver unit" refers to any unit or device acting as a receiver in a given communication scenario, i.e. as a counterpart to the above-mentioned transmitter unit. Since in a typical radio based communications system both the transmitter unit and the receiver unit are generally devised in the form of transceiver units, i.e., they are each able to transmit and to receive communication signals, the communication roles are also frequently and repeatedly inverted during communication sessions.

Finally, the term "derivative" always refers to a derivative of a respective order n with respect to time.

The basic idea of the present invention resides in the fact that virtually all quantities which characterize the performance of a radio based communications system show a similar characteristic with respect to a distance of the receiver unit, e.g. a mobile terminal, from the transmitter unit, e.g. a base station. Typically, a base station is a stationary unit which is located in the origin or at the corner of a corresponding radio cell. A mobile terminal present in said radio cell is thus located at a certain distance from the base station. Since the base station usually is in the center or at the corner of the radio cell, said distance is also referred to as "radial" distance. It is well known in this context that for a radio quantity like the data rate or the coding scheme, the sensitivity in the angular direction, i.e. perpendicular to a straight line connecting the transmitter and the receiver, is much smaller than the sensitivity in the radial direction. This is equivalent to saying that for a given change in radial distance the corresponding change in said radio quantity will be greater than for a comparable change in angular distance. Additionally, in the radial direction the sensitivity increases with decreasing distance from the transmitter station.

Appended FIG. 1 shows a typical spatial distribution of data rates across a radio cell RC in units of kBit/s as an example of the above-described scenario. As can be observed from FIG. 1, the sensitivity of the data rate in angular direction A, i.e. along imaginary concentrical circular lines around the origin (X=0; Y=0), is much smaller than the sensitivity in radial direction R. In radial direction the sensitivity increases with decreasing distance from the transmitter BS, which is assumed to be fixed in the origin in this illustration. Similar dependencies can be observed for other radio quantities, e.g. interference, bit error rate, coding schemes, etc. Therefore, in an embodiment of the method according to the present invention the adaptation frequency is dependent on the distance between the transmitter unit and the receiver unit.

With reference to FIG. 1, the temporal behavior of the data rates encountered by a moving receiver unit MT located at a distance D from the transmitter unit BS in the depicted radio cell RC mainly depends on the relative velocity of the transmitter unit BS and the receiver unit MT, i.e. in the present example on the velocity v of the moving receiver unit MT, which has components $v_A$, $v_R$ in angular direction A and in radial direction R, respectively. Accordingly, in another embodiment of the inventive method the adaptation frequency is dependent on a measure of a relative motion of the transmitter unit and the receiver unit. As a general rule, the higher the relative velocity, the higher the adaptation frequency. In the case of the example in FIG. 1: The faster the receiver MT (in the radial direction R), the faster the changes. In this context, the term "measure" refers to any suitable quantity related to the relative motion of transmitter and receiver, e.g. an absolute value |v| of the relative velocity v or of one of its components $v_A$, $v_R$.

As pointed out above with reference to FIG. 1, the encountered sensitivity of radio quantities is much more pronounced in the radial direction R than in the angular direction A. Therefore, for a given relative velocity v of transmitter BS and receiver MT particular attention should be paid to the radial component $v_R$ of the relative velocity v, i.e. to the radial speed component of the moving receiver MT in the present example. Thus, in a further embodiment of the method according to the invention the adaptation frequency is dependent on a radial component of a relative velocity of the transmitter unit and the receiver unit.

In its simplest form the adaptation rate ν is given by the ratio of the radial component of the relative velocity, $v_R$, and the distance D between the the transmitter unit and the receiver unit: ν=$v_R$/D. In a corresponding embodiment of the inventive method the adaptation frequency is therefore determined as ν=$v_R$/D, wherein ν denotes the adaptation frequency, $v_R$ denotes a radial component of a relative velocity of the transmitter unit and the receiver unit, and D denotes the distance between the transmitter unit and the receiver unit.

Advantageously, the relative velocity of the transmitter unit and the receiver unit can be determined without requiring any additional measuring signal by using the (relativistic) Doppler effect which leads to a frequency shift of the radio spectrum used by the entities. Therefore, in a further embodiment of the method according to the present invention, a Doppler frequency shift Δf of a radio frequency signal transmitted between the transmitter unit and the receiver unit, in particular of at least parts of a radio frequency spectrum used for communication by the radio based communications system, is measured to determine a relative velocity of the transmitter unit and the receiver unit, e.g.:

$$\Delta f = f - f_0 = f_0 \cdot \left[ \frac{(1+v_R/c)}{\sqrt{1-v_R^2/c^2}} - 1 \right] \approx f_0 \cdot \frac{v_R}{c}, \quad (1)$$

wherein $f_0$ is an unshifted radio frequency, v is the radial component of the relative velocity, and c is the speed of light.

In order to ensure that only suitable values are obtained for the adaptation rate or frequency ν, upper and lower boundaries, $v_{min}$ and $v_{max}$, respectively, limit the range of valid adaptation rate values, i.e. the adaptation frequency is chosen to lie between predetermined boundary values. Correspondingly, the resulting algorithm can be transformed into the following expression according to which the adaptation frequency ν is established as:

$$\nu = \min\{v_{min} + K \cdot (|\Delta f|)/(f_0 \cdot T), v_{max}\}, \quad (2)$$

wherein $v_{min}$ is a minimum adaptation frequency, $v_{max}$ is a maximum adaptation frequency, Δf is a frequency shift of a radio frequency signal transmitted between the transmitter unit and the receiver unit, $f_0$ is the unshifted radio frequency of said radio frequency signal, T is a signal propagation time of said radio frequency signal, and K is a system constant. The propagation time T may be determined by measuring the round trip time of a dedicated communication channel (see, e.g., 3rd Generation Partnership Project document TS 25.215, Chapter 5.2.8) or by employing a pilot signal. Another possibility is to exploit the position information received from an advanced positioning system like the "Global Positioning System" (GPS). Here, the measured position of, e.g., the mobile terminal is forwarded to the base station, which then calculates the absolute distance or propagation time between the two entities. Inertial sensors and other means for measuring longitudinal and angular acceleration might be also used to determine the distance between the transmitter and receiver. In the absence of a relative motion $v_{min}$ is chosen as the preferred adaptation frequency.

Alternatively, a narrowband or single-frequency pilot signal may be employed to improve the accuracy of the Doppler shift measurement process. In a corresponding embodiment of the method according to the invention the distance between the transmitter unit and the receiver unit is determined by measuring a propagation time of a dedicated pilot signal transmitted between the transmitter unit and the receiver unit. To this end, the method according the present invention advantageously comprises the following steps:

a dedicated pilot signal is transmitted by the transmitter unit to the receiver unit, a corresponding transmission time is stored in the transmitter unit, upon reception of the pilot signal by the receiver unit a response signal is generated by the receiver unit and transmitted to the transmitter unit, which essentially comprises a transmission time of the response signal by the receiver unit, a propagation time of the pilot signal between the transmitter unit and the receiver unit is determined essentially as a time difference between the transmission time and the reception time, and the distance between the transmitter unit and the receiver unit is determined from the propagation time.

Alternatively, the method performs the following steps to determine the distance or propagation time:

the transmitter unit receives its own absolute position from an advanced positioning system like the satellite-based "Global Positioning System" (GPS), the transmitter unit forwards its position to the receiver unit, and the receiver unit determines the distance to the transmitter unit taking into account its own absolute position.

In addition, the distance can be determined employing the following procedure:

the receiver unit has knowledge about the absolute start position of the transmitter unit, the transmitter unit measures its longitudinal and angular acceleration and determines its displacement by integration over a time interval, the transmitter unit informs the receiver unit about its displacement since the last position update, the receiver unit determines the new position of the transmitter unit, the receiver unit determines the distance to the transmitter unit, and the receiver unit sets the start position of the transmitter unit to the new position.

In order to save system resources, the pilot signal preferably is one of a narrowband signal and a single frequency signal.

In another embodiment of the inventive method, the initial pilot signal for triggering a response signal can be omitted.

Thus, in a general way the proposed method takes advantage of the above-mentioned spatial distribution of radio quantities and combines the corresponding sensitivity characteristics with physical quantities in connection with the distance between transmitter and receiver, i.e. the distance itself, and/or the relative velocity of transmitter and receiver, which can be summarized as zero-th and first order derivatives of the distance with respect to time.

According to a second aspect of the invention, the object is also achieved by means of radio based communications system, comprising:
at least one transmitter unit,
at least one receiver unit, and
adaptation means for adapting at least one system parameter defining a connection between the transmitter unit and the receiver unit wherein the adaptation means further comprise:
determining means for dynamically determining at least one derivative of order n (n=0; 1) of a distance between the transmitter unit and the receiver unit with respect to time, and
adjusting means for dynamically adjusting an adaptation frequency at which the system parameter is adapted as a function of said derivative of the distance between the transmitter unit and the receiver unit.

In an embodiment of the system according the present invention the adaptation means, the determining means, and the adjusting means are comprised in the transmitter unit, which—in a further embodiment of the system according the present invention—is a stationary unit, e.g. an access point or a base station, such that the necessary additional equipment can be implemented without excessive difficulties in terms of weight, construction space, or the like. Correspondingly, the receiver unit can take the form of a mobile terminal.

In correspondence with an embodiment of the inventive method described earlier, in another embodiment of the system according the present invention the determining means comprise means for measuring a relative motion of the transmitter unit and the receiver unit. Advantageously, in still another embodiment of the system according the present invention the determining means comprise means for measuring a radial component of a relative velocity of the transmitter unit and the receiver unit.

In order to facilitate determining the relative velocity of the transmitter unit and the receiver unit without recurring to additional measuring signals, according to a further development of the inventive system the determining means are adapted to measure a Doppler frequency shift of at least parts of a radio frequency spectrum used for communication by the radio based communications system to determine said relative velocity. Alternatively, however, in order to improve the accuracy of the Doppler shift measurement the determining means can be adapted to transmit a dedicated pilot signal and to determine the distance between the transmitter unit and the receiver unit and/or their relative velocity from a propagation time of the pilot signal between the transmitter unit and the receiver unit and from a corresponding Doppler frequency shift, respectively.

In another embodiment of the system according to the present invention, determining the inter unit distance may be supported further by providing response means for transmitting a response signal to said pilot signal, wherein said response signal comprises a time, e.g. a time datum in the form of a time stamp, which can be employed to derive the propagation time if a corresponding reception time of at least the response signal is equally known.

According to a third aspect of the present invention there is provided a transmitter unit for use in the inventive radio based communications system, in particular for performing the method for adapting at least one system parameter according to the invention, said transmitter unit having adaptation means for adapting at least one system parameter defining a connection between the transmitter unit and a receiver unit, wherein the adaptation means further comprise:
determining means for dynamically determining at least one derivative of order n, n=0; 1, of a distance between the transmitter unit and the receiver unit with respect to time, and
adjusting means for dynamically adjusting an adaptation frequency at which the system parameter is adapted as a function of said derivative of the distance between the transmitter unit and the receiver unit.

When using the above-mentioned pilot signal for determining the distance between the transmitter unit and a receiver unit, according to a further embodiment of the inventive transmitter unit, the latter advantageously comprises receiving means for receiving one of a dedicated narrowband pilot signal and a dedicated single frequency pilot signal from the receiver unit, which essentially comprises a transmission time of the pilot signal by the receiver unit, wherein the determining means are adapted to determine a propagation time of the pilot signal between the transmitter unit and the receiver unit from said transmission time and to determine the distance between the transmitter unit and the receiver unit from the propagation time.

According to a fourth aspect of the present invention there is provided a receiver unit for use in the inventive radio based communications system, in particular in connection with the above-described transmitter unit, and in particular for performing the method for adapting at least one system parameter according to the present invention, comprising transmitting means for transmitting to the transmitter unit one of a dedicated narrowband pilot signal and a dedicated single frequency pilot signal, which comprises a transmission time.

Finally, in accordance with a fifth aspect of the present invention there is provided a computer program product for use in a radio based communications system with at least one transmitter unit and at least one receiver unit, said computer program product being operable to perform the above-described method according to the present invention.

Further advantages and characteristics of the present invention can be gathered from the following description of preferred embodiments with reference to the enclosed drawings. The features mentioned above as well as below can be used in accordance with the invention either individually or in conjunction. The embodiments mentioned are not be be understood as an exhaustive enumeration but rather as examples with regard to the underlying concept of the present invention.

DETAILED DESCRIPTION OF THE DRAWINGS

Figure 1:
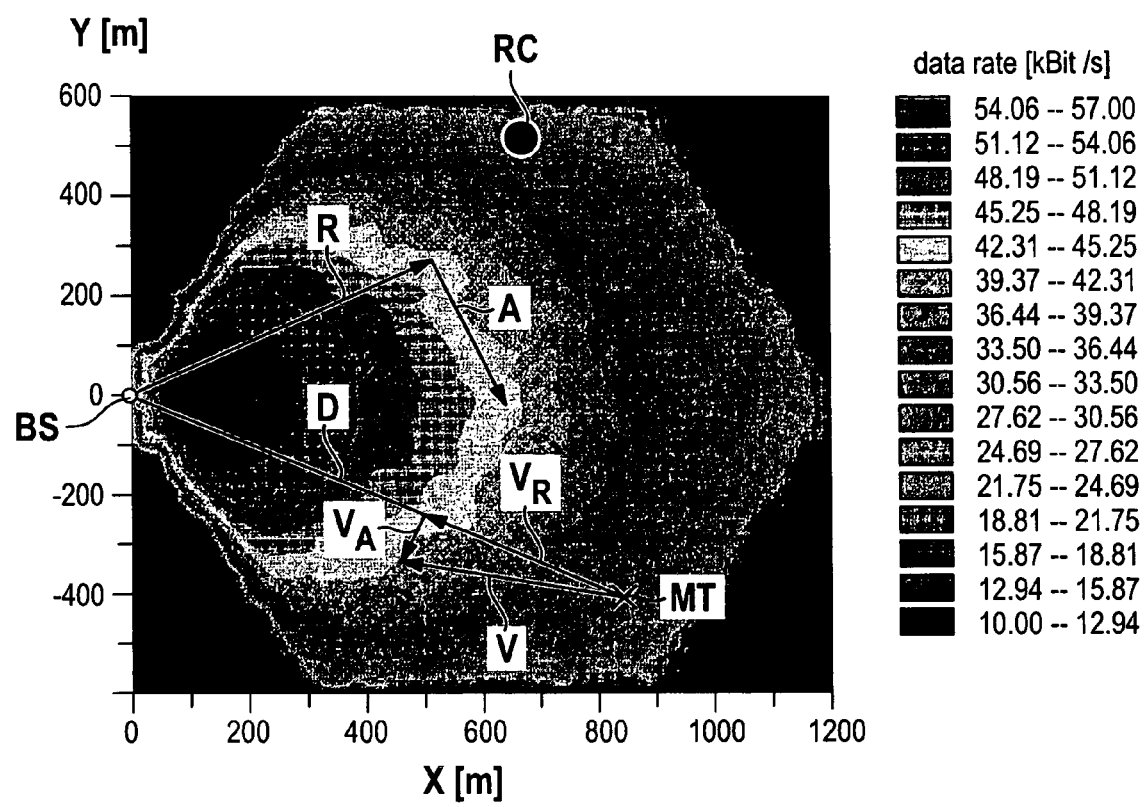
FIG. 1 is a diagram of a radio cell in a radio based communications system comprising a stationary transmitter unit and a moving receiver unit.

The following detailed description of the invention refers to the accompanying drawings. The same reference numerals may be used in different drawings to identify the same or similar elements.

FIG. 1 has been described above for to illustrate the basic concept of the present invention.

Figure 2:
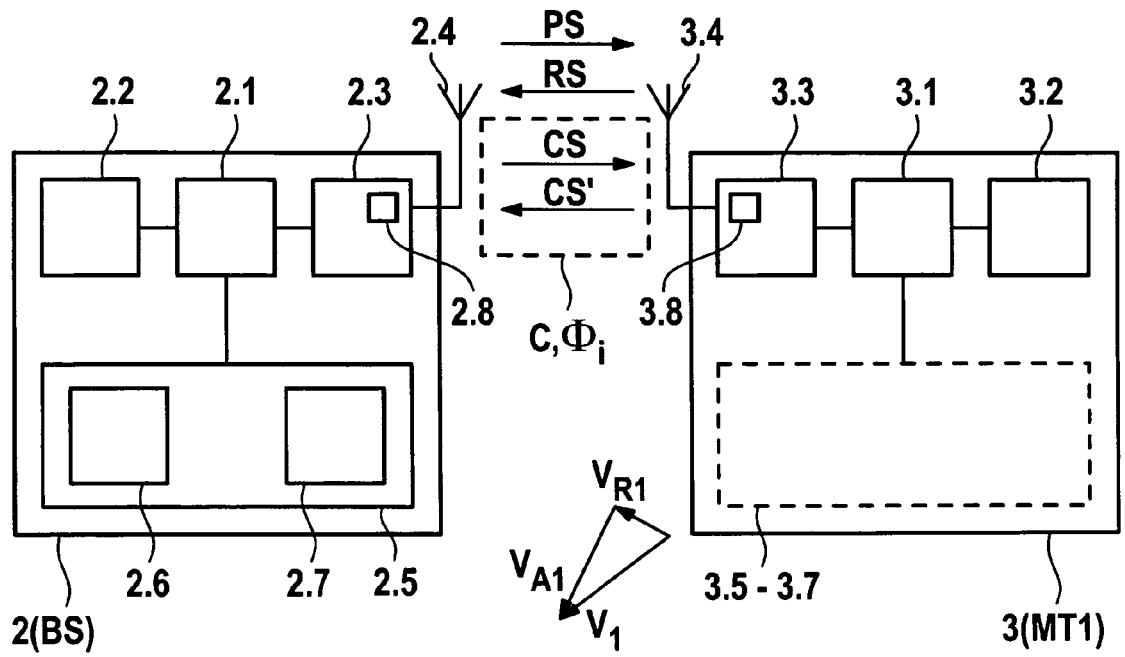
FIG. 2 is a schematic diagram of a generic radio based communications system in accordance with the present invention.
Figure 2:
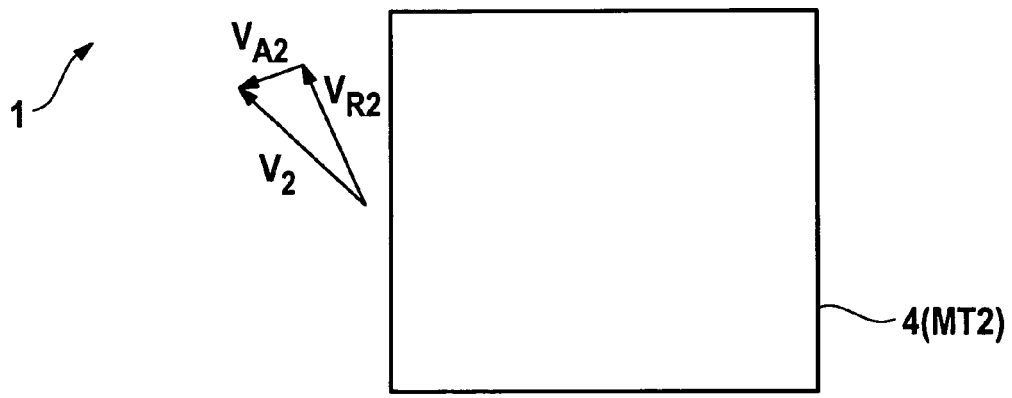

FIG. 2 shows a schematic diagram of a radio based communications system 1 in accordance with the present invention. The radio based communications system 1 comprises a transmitter unit 2—hereinafter also referred to as base station BS—and two receiver units 3, 4—hereinafter also referred to as mobile terminals MT1, MT2. The base station BS may be stationary, and the mobile terminals MT1, MT2 are moving at relative velocities $v_1$, $v_2$ with respect to the base station BS. The relative velocities $v_1$ and $v_2$ can be decomposed to yield radial relative velocities $v_{R1}$, $v_{R2}$ and angular relative velocities $v_{A1}$, $v_{A2}$, respectively. However, the present invention is not limited to such a scenario.

The transmitter unit 2 comprises data processing means 2.1, e.g. a microprocessor, for controlling an operation of the transmitter unit 2. The data processing means 2.1 are connected with storage means 2.2. Furthermore, the transmitter unit 2 comprises transceiving means 2.3 in operative connection with antenna means 2.4 for transmitting radio communication signals CS to and for receiving radio communication signals CS' from the receiver units 3, 4. Generally, the transceiving means 2.3 transmit (and receive) radio signals using a predetermined spectrum of radio frequencies. A given frequency from said spectrum will hereinafter be referred to as a frequency $f_0$. The transmitter unit 2 further comprises adaptation means 2.5 for adapting at least one system parameter defining a connection C between the transmitter unit 2 and a receiver unit 3. Said system parameters are denoted φi in FIG. 2. For instance, the adaptation means 2.5 could be adapted to re-establish a communication data rate or output power in accordance with given physical parameters of the radio based communications system 1 following the general idea of the present invention, as will be described in detail below. The adaptation means further comprise determining means 2.6 and adjusting means 2.7, the specific function of which will become apparent later. In the transceiving means 2.3 are included means 2.8 for transmitting a dedicated narrowband or single frequency pilot signal PS to a receiver units 3, 4 and for receiving a corresponding response signal RS therefrom. The adaptation means 2.5 including the determining means 2.6 and the adjusting means 2.7 can be implemented in the form of software elements, i.e. specific program code to be stored in the storage means 2.2 and executed by means of the processing means 2.1.

A configuration of the receiver units 3, 4 will now be explained with reference to transmitter unit 3: The transmitter unit 3 is basically set up in analogy to the above-described transmitter unit 2 and comprises data processing means 3.1, e.g. a microprocessor, for controlling an operation of the receiver unit 3. The data processing means 3.1 are connected with storage means 3.2. Furthermore, the receiver unit 3 comprises transceiving means 3.3 in operative connection with antenna means 3.4 for transmitting radio communication signals CS' to and for receiving radio communication signals CS from the transmitter unit 2. Generally, the transceiving means 3.3 transmit (and receive) radio signals using a predetermined spectrum of radio frequencies. In a "symmetric" embodiment of the radio based communications system 1 according to the present invention, the receiver unit 3, too, may comprise adaptation means 3.5, determining means 3.6, and adjusting means 3.7 as described above in connection with the transmitter unit 2 and as indicated by means of a dashed box in FIG. 2. As their configuration and function will be essentially similar to that of the corresponding means comprised in the transmitter unit 2, they will not be described here in detail. Furthermore, the receiver unit 3 comprises means 3.8 for receiving from the transmitter unit 2 the dedicated narrowband or single frequency pilot signal PS and for transmitting a corresponding response signal RS back to the transmitter unit 2.

During operation of the radio based communications system 1, the transmitter unit 2 communicates via radio signals RS with the receiver unit using certain system parameters φi, e.g. a certain data rate or output power. The parameters φi have to be updated in accordance with the radio quantities available at a given location of the receiver unit 3, 4 in the radio cell RC (cf. FIG. 1) generated by the transmitter unit 2. According to one embodiment of the present invention, the radial component $v_R$ of the relative velocity v of the transmitter unit 2 and a given receiver unit 3, 4 is determined dynamically in the determining means 2.6 and used in the adjusting means 2.7 for dynamically adjusting the adaptation frequency ν at which the system parameters φi are adapted as a function of said derivative of the distance between the transmitter unit 2 and a given receiver unit 3, 4, i.e. a measurable physical parameter of the radio based communications system 1. Preferably, the determining means 2.6 are adapted to determine the velocity component $v_R$ from the Doppler shift Δf of the radio signals CS' transmitted by the moving receiver unit 3, 4. Having a nominal frequency $f_0$, they arrive at the transmitter unit 2 with their frequency shifted by Δf due to the relative motion (cf. Eq. 1). Said frequency shift Δf is used as a measure of the (radial) relative velocity $v_R$ of the transmitter unit 2 and the receiver unit 3, 4, which is then used to establish the adaptation rate ν according to Eq. 2. If Δf=0, hence $v_R$=0, and the adaptation rate is set to a predetermined minimum rate $v_{min}$. Otherwise, if the calculated value for ν exceeds a predetermined maximum value then said maximum value $v_{max}$ is taken as the new adaptation frequency ν.

Alternatively or additionally, the dedicated pilot signal PS can be used to improve the accuracy of the frequency shift detection. The narrowband or single frequency pilot signal PS is transmitted from the transmitter unit 2 to the receiver unit 3, 4 by means of the pilot signal transmitting means 2.8 via the antenna means 2.4. The pilot signal PS is received by the receiver means by means of the antenna means 3.4 and the receiving means 3.8. After reception of the pilot signal PS, the receiver unit 3, 4 transmits a response signal RS to the transmitter unit 2 using its transmitting means 3.8 and the antenna means 3.4. The response signal RS includes a time stamp TRS indicative of a reception time of the pilot signal PS in the receiver. Alternatively, the time stamp TRS could be indicative of a transmission time of the response signal. Upon reception of the response signal RS by the transmitter unit 2 the time stamp TRS is extracted from the received response signal RS and stored in the storage means 2.2. It can thus be compared in the determining means 2.6 with a reception time of the response signal RS by the transmitter unit 2 to deduce the signal propagation time T needed for the dynamic frequency adaptation algorithm in Eq. 2. Additionally, the transmitter unit 2 could be adapted to store a time stamp TPS indicate of the transmission time of the pilot signal PS in the storage means 2.2 when sending the pilot signal PS to the receiver unit 3, 4. Thus, upon reception of the response signal RS, the two time stamps TPS and TRS could be compared in the determining means 2.6 to deduce a round-trip propagation time 2T between the transmitter and the receiver, i.e. a value equal to twice the propagation time T. The pilot signal PS would advantageously be transmitted at a rate v' corresponding (and possibly coinciding) with the adaptation rate v, and which could be changed similarly, i.e. in a synchronous fashion. In another alternative embodiment of the system according to the present invention, sending the pilot signal PS could be omitted such that solely a "response" signal RS is transmitted between the receiver unit 3, 4 and the transmitter unit 2 in order to determine the propagation time T. In this case, the response signal RS as depicted in FIG. 2 could be regarded as being equivalent to the pilot signal PS.

As already mentioned above, the pilot and/or response signals PS, RS could also be used for determining the radial relative velocity $v_R$ by measuring a Doppler frequency shift $\Delta f$ of the pilot and/or response signals PS, RS. To this end, preferably a single frequency pilot/response signal PS, RS is used, e.g., having a nominal frequency $f_0$. In such an embodiment of the present invention, the communication signals CS, CS' transmitted between the transmitter unit 2 and the receiver unit 3, 4 would be used for communication purposes only, and would not be subject to any form of additional signal processing for to detect a Doppler frequency shift $\Delta f$.

Figure 3:
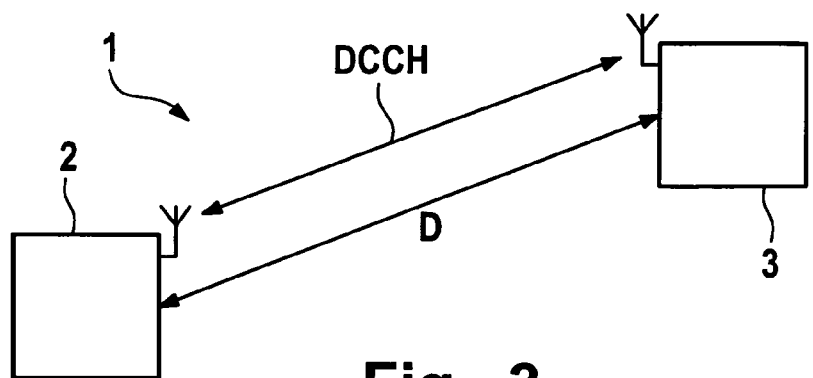
FIG. 3 is a schematic diagram of a first embodiment of the radio based communications system in accordance with the present invention.
Figure 4:
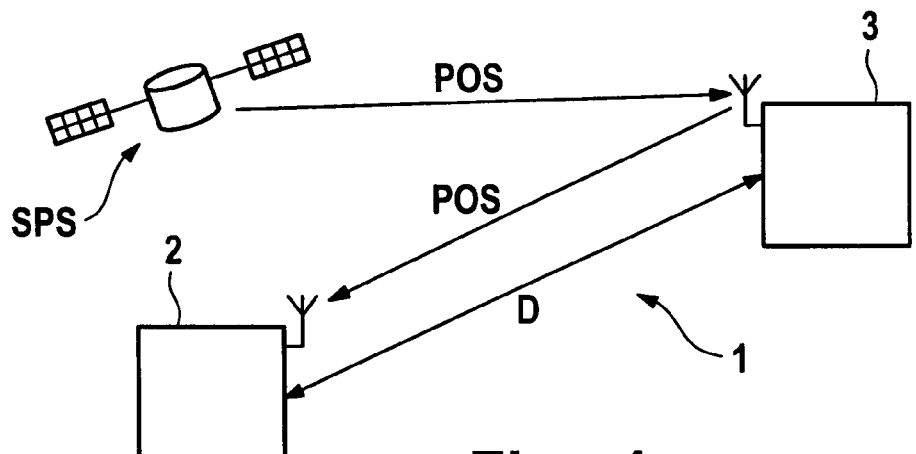
FIG. 4 is a schematic diagram of a second embodiment of the radio based communications system in accordance with the present invention.

FIG. 3 shows a schematic diagram of a radio based communications system 1 in accordance with the present invention and essentially similar to the illustration in FIG. 2, which is particularly adapted to determine the distance D between the communicating entities. Again, the radio based communications system 1 comprises a transmitter unit 2 and a number of receiver units 3, only one of which is depicted for reasons for clarity. For to determine the propagation time T (cf. Eq. 2) and or the distance D (D=T·c) a dedicated communication channel DCCH (see, e.g., 3rd Generation Partnership Project document TS 25.215, Chapter 5.2.8) is provided between the transmitter unit 2 and the receiver unit 3, such that T can be determined by either unit 2, 3 from a round trip time of signals on said dedicated communication channel DCCH An alternative approach to the problem of determining the distance D is depicted in FIG. 4, which is essentially similar to above-described FIG. 3. FIG. 4 shows a schematic diagram of a second embodiment of the radio based communications system 1 in accordance with the present invention, wherein the system 1, i.e. the receiver unit 3 is in operative connection with a satellite-based positioning system SPS such as GPS. Accordingly, the inventive system is adapted to perform the following steps to determine the distance D (or the corresponding propagation time T): One of the units 2, 3, e.g. the receiver unit 3, receives data POS indicative of its own absolute position from the satellite-based positioning system SPS. The receiver unit 3 forwards its position data POS to the transmitter unit 2, and the transmitter unit 2 determines the distance D to the receiver unit 3 taking into account its own absolute position, which can either be fixed in the case of a stationary base station or changing, in which case the transmitter unit 2 would preferably be in operative connection with the satellite-based positioning system SPS, too. As stated above, since all of the units 2, 3 are adapted to transmit and receive the above-described roles of receiver units and transmitter units can be exchanged within the scope of the present invention.

Figure 5:
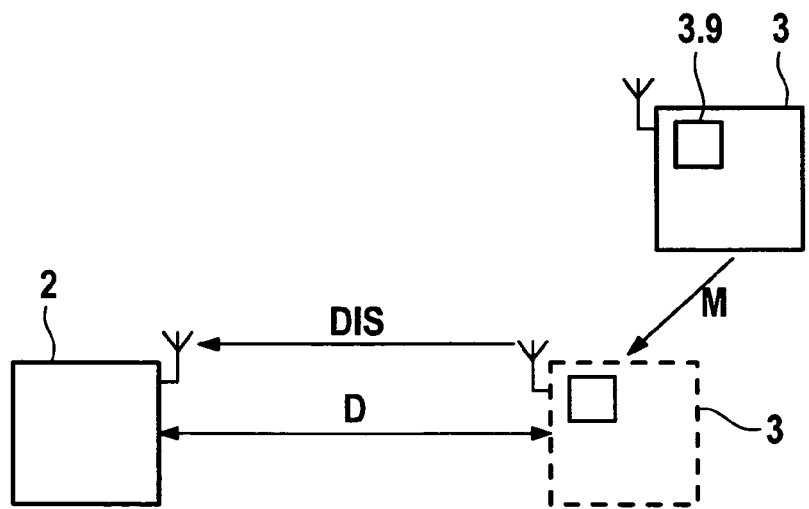
FIG. 5 is a schematic diagram of a third embodiment of the radio based communications system in accordance with the present invention.

FIG. 5 shows a schematic diagram of a third embodiment of the radio based communications system 1 in accordance with the present invention, wherein at least the receiver unit 3 further comprises means 3.9 for measuring longitudinal and angular acceleration, in particular an inertial-sensor system. Provided the transmitter unit 2 has knowledge about the absolute start position of the mobile receiver unit 3, e.g. by means of a position update, the receiver unit 3 then measures its longitudinal and angular acceleration in connection with a motion in the direction of arrow M, the new position of the receiver unit 3 being illustrated by means of a dashed box, and determines its displacement by integration over a time interval. The receiver unit 3 then informs the transmitter unit 2 about said displacement since the last position update by transmitting corresponding displacement data DIS. Using said displacement data DIS the transmitter unit 2 determines the new position of the receiver unit 3, e.g. the dashed box. From said new position the transmitter unit 2 determines the distance D to the receiver unit 3, and accordingly sets the start position of the receiver unit 3 to the new position. Again, the above-described roles of receiver units and transmitter units can be exchanged within the scope of the present invention.

Thus, the method according to the present invention provides an efficient way of relating the need to update system parameters in radio based communications systems to physically measurable quantities in connection with constituents of said system, such that the parameter adaptation rate itself is adapted dynamically and system resources can be used in a optimized fashion.

The invention claimed is:

1. A method for adapting at least one system parameter, the method comprising:
defining a connection between a transmitter unit and a receiver unit in a radio based communications system, wherein an adaptation frequency at which the system parameter is adapted is dependent on at least one derivative of order n, n=0; 1, of a distance between the transmitter unit and the receiver unit with respect to time, and
dynamically determining the at least one derivative during system operation, wherein the adaptation frequency is dynamically determined as
$v=\min\{v_{min}+K\cdot(|\Delta f|)/(f_0 \cdot T), v_{max}\}$, wherein $v_{min}$ is a minimum adaptation frequency, $v_{max}$ is a maximum adaptation frequency, $\Delta f$ is a frequency shift of a radio frequency signal transmitted between the transmitter unit and the receiver unit, $f_0$ is a nominal radio frequency of the radio frequency signal, T is a signal propagation time of the radio frequency signal, and K is a system constant.

2. The method according to claim 1 wherein the adaptation frequency is dependent on a radial component of a relative velocity of the transmitter unit and the receiver unit.

3. The method according to claim 1, wherein a Doppler frequency shift of at least parts of a radio frequency spectrum used for communication by the radio based communications system is measured to determine a relative velocity of the transmitter unit and the receiver unit.

4. The method according to claim 1, wherein the distance between the transmitter unit and the receiver unit is determined by measuring a propagation time of a dedicated pilot signal transmitted between the transmitter unit and the receiver unit.

5. The method according to claim 1, wherein the distance between the transmitter unit and the receiver unit is determined by measuring a propagation time of a dedicated communication channel transmitted between the transmitter unit and the receiver unit.

6. The method according to claim 1, wherein the distance between the transmitter unit and the receiver unit is determined by analyzing signals from satellite- and/or ground-based positioning systems.

7. The method according to claim 1, wherein the distance between the transmitter unit and the receiver unit is determined by analyzing signals from means for measuring longitudinal and angular acceleration, in particular inertial-sensor systems.

8. A computer program product stored in a storage means for use in a radio based communications system with at least one transmitter unit and at least one receiver unit, operable to perform the method according to claim 1.

9. A radio based communications system, comprising:
   at least one transmitter unit,
   at least one receiver unit,
   adaptation means for adapting at least one system parameter defining a connection between the transmitter unit and the receiver unit,
   determining means for dynamically determining at least one derivative of order n, n=0; 1, of a distance between the transmitter unit and the receiver unit with respect to time, and
   adjusting means for dynamically adjusting an adaptation frequency at which the system parameter is adapted as a function of the derivative of the distance between the transmitter unit and the receiver unit,
   the adaptation means comprising:
      determining means for dynamically determining the adaptation frequency as $v=\min\{v_{min}+K\cdot(|\Delta f|)/(f_0\cdot T), v_{max}\}$, wherein $v_{min}$ is a minimum adaptation frequency, $v_{max}$ is a maximum adaptation frequency, $\Delta f$ is a frequency shift of a radio frequency signal transmitted between the transmitter unit and the receiver unit, $f_0$ is a nominal radio frequency of the radio frequency signal, T is a signal propagation time of the radio frequency signal, and K is a system constant.

10. The radio based communications system according to claim 9, wherein the adaptation means is dependent on a radial component of a relative velocity of the transmitter unit and the receiver unit.

11. The radio based communications system according to claim 9, wherein a Doppler frequency shift of at least parts of a radio frequency spectrum used for communication by the radio based communications system is measured to determine a relative velocity of the transmitter unit and the receiver unit.

12. The radio based communications system according to claim 9, wherein the distance between the transmitter unit and the receiver unit is determined by measuring a propagation time of a dedicated pilot signal transmitted between the transmitter unit and the receiver unit.

13. The radio based communications system according to claim 9, wherein the distance between the transmitter unit and the receiver unit is determined by measuring a propagation time of a dedicated communication channel transmitted between the transmitter unit and the receiver unit.

14. The radio based communications system according to claim 9, wherein the distance between the transmitter unit and the receiver unit is determined by analyzing signals from satellite and/or ground-based positioning systems.

15. The radio based communications system according to claim 9, wherein the distance between the transmitter unit and the receiver unit is determined by analyzing signals from means for measuring longitudinal and angular acceleration, in particular inertial-sensor systems.

16. A transmitter unit for use in a radio based communications system, the transmitter unit having:
   adaptation means for adapting at least one system parameter defining a connection between the transmitter unit and a receiver unit of the radio based communications system,
   determining means for dynamically determining at least one derivative of order n, n=0; 1, of a distance between the transmitter unit and the receiver unit with respect to time, and
   adjusting means for dynamically adjusting an adaptation frequency at which the system parameter is adapted as a function of the derivative of the distance between the transmitter unit and the receiver unit,
   the adaptation means comprising:
      determining means for dynamically determining the adaptation frequency as $v=\min\{v_{min}+K\cdot(|\Delta f|)/(f_0\cdot T), v_{max}\}$, wherein $v_{min}$ is a minimum adaptation frequency, $v_{max}$ is a maximum adaptation frequency, $\Delta f$ is a frequency shift of a radio frequency signal transmitted between the transmitter unit and the receiver unit, $f_0$ is a nominal radio frequency of the radio frequency signal, T is a signal propagation time of the radio frequency signal, and K is a system constant.

17. The transmitter unit according to claim 16, wherein receiving means for receiving one of a dedicated narrowband pilot signal and a dedicated single frequency pilot signal from the receiver unit, which essentially comprises a transmission time of the pilot signal by the receiver unit, wherein the determining means are adapted to determine a propagation time of the pilot signal between the transmitter unit and the receiver unit from said transmission time and to determine the distance between the transmitter unit and the receiver unit from the propagation time.

18. A receiver unit for use in a radio based communications system in connection with a transmitter unit according to claim 16, the receiver unit including transmitting means for transmitting to the transmitter unit one of a dedicated narrowband pilot signal and a dedicated single frequency pilot signal at a second adaptation frequency substantially corresponding to the adaptation frequency of the transmitter unit, which comprises a transmission time, thereby enabling the transmitter unit to improve the accuracy of the frequency shift detection.

19. The transmitter unit according to claim 16, wherein the adaptation means is dependent on a radial component of a relative velocity of the transmitter unit and a receiver unit.

20. The transmitter unit according to claim 16, wherein the adaptation means is dependent on a radial component of a relative velocity of the transmitter unit and a receiver unit.

* * * * *